United States Patent

Peregoy et al.

[19]

[11] Patent Number: 6,049,395
[45] Date of Patent: Apr. 11, 2000

[54] METHOD AND SYSTEM FOR ACHIEVING ENHANCED GRAY LEVELS IN A SCREEN CELL ARRAY

[75] Inventors: James B. Peregoy, Groton, Mass.; Edward T. Chrusciel, Nashua, N.H.; J. Brett Lefebvre, Tyngsboro, Mass.

[73] Assignee: Optronics International Corp., Chelmsford, Mass.

[21] Appl. No.: 09/143,915

[22] Filed: Aug. 31, 1998

Related U.S. Application Data

[60] Provisional application No. 60/057,438, Sep. 2, 1997.

[51] Int. Cl.$^7$ ........................................ G06F 15/00
[52] U.S. Cl. ............................... 358/1.9; 358/1.2
[58] Field of Search ............................. 358/1.9, 1.8, 1.7, 358/1.6, 1.4, 1.3, 1.2, 1.1, 1, 1.11, 1.13, 1.16, 1.17, 1.18, 504, 534–536, 404, 406, 429, 444, 447, 448, 455–460, 465–466, 298; 382/169, 162; 347/131, 1, 2, 3, 5

[56] References Cited

U.S. PATENT DOCUMENTS 5,187,594  2/1993  Deutsch et al. .......................... 358/455
5,274,473  12/1993  Kidd et al. ............................... 358/458

*Primary Examiner*—Dov Popovici
*Attorney, Agent, or Firm*—Bromberg & Sunstein LLP

[57] ABSTRACT

A method and system for digitally reproducing an image on a printing plate that includes enhancing gray levels so that plate may be imaged at lower resolutions and therefore higher speed. An image is scanned and a two dimensional array of optical density values. A comparison is made with a screen cell array having a repetitive pattern of a plurality of different screen cells. Each screen cells includes screen comparison values which when arranged in a sequence of increasing values are interleaved with values in a similarly arranged sequence of values from one of the different screen cells of the screen cell array. Pixel comparisons generate a binary value which is used to selectively operate a laser beam to expose microdots on a printing plate.

3 Claims, 4 Drawing Sheets

|   |    |    | 55 |    |
|---|----|----|----|----|
|   | 20 | 15 | 10 | 50 |
|   | 25 | 0  | 5  | 45 |
|   | 30 | 35 | 40 |    |
|   |    |    |    |    |

FIG. 2

|   |   |   |   |   |
|---|---|---|---|---|
|   |   |   |   |   |
|   |   | X |   |   |
|   |   |   |   |   |
|   |   |   |   |   |

METHOD AND SYSTEM FOR ACHIEVING ENHANCED GRAY LEVELS IN A SCREEN CELL ARRAY

The present application bases priority from U.S. Provisional Patent Application No. 60/057,438, filed Sep. 2, 1997, the full disclosure of which is hereby incorporated by reference herein.

BACKGROUND OF THE INVENTION

Printing is a manufacturing process. The profitability of a printing operation is tied closely to production throughput. The faster a printer can produce quality ink on paper, the more profit can be generated. A major barrier to faster print production lies in the pre-press department. Even in the nearly digital filmless environment of computer-to-plate imaging, it takes a significant amount of time to image plates for commercial quality printing. Speeding up the plate manufacturing process would offer a variety of benefits. Faster plate production can result in greater output, increased plate setter utilization and increased press utilization.

In the world of digital imaging, a gray level is typically represented by a value from 0–255. 256 shades of gray are usually considered sufficient to represent realistic images. In the printing industry shades of gray are implemented by modulating the size of screen dots. Screen dots are imaged at different frequencies and angles. The angles are associated with ink color and the frequencies are used to achieve image quality. Typically the higher the frequency, the better the quality of printing.

A screen dot in the digital world is composed of microdots or pixels. An array of these pixels is used to create a printing screen dot. An array of 16×16 pixels is needed to represent 256 shades of gray. A pixel is tied to the imaging resolution of a device that creates film or plate for the printing process. Some devices support multiple resolutions. For example, there are imaging devices with 1000, 2000, and 4000 pixels per inch. At lower resolutions, it is impossible to support high screen frequencies while maintaining a high number of gray shades. At 1000 ppi, a 16×16 pixel array can support only 62.5 line per inch screen. This screen frequency is not good enough for typical color printing work.

In order to increase the screen frequency, printers are forced to image film and plate at higher resolutions. While this achieves the desired quality, it also slows production. For example, a plate imaged at 2000 ppi will take twice as long to image as one done at 1000 ppi.

Another approach besides increasing resolution is to sacrifice the number of shades of gray that can be attained with a certain cell size. A cell size of 10×10 will provide 100 shades but will yield a screen of only 100 lines per inch at 1000 ppi. In order to achieve screen frequencies in the range of 140+1 pi we need cell sizes on the order of 6×6. The number of shades of gray achievable with this approach is well below an acceptable amount.

SUMMARY OF THE INVENTION

A method of an embodiment of the invention is directed to digitally reproducing an image on a printing plate. The image is scanned to produce a pixel-by-pixel digitization of color. A two dimensional array of optical density values is determined from the digitized image. Each pixel of the array is compared to a correspondingly located pixel in a screen cell array. The screen cell array is a repetitive pattern of a plurality of different screen cells. Each screen cell has a two dimensional array of screen comparison values for producing a printed dot which expands in size when compared with an optical density value of increased value. When the screen comparison values of each screen cell are arranged in a sequence of increasing values, the values are interleaved with values in a similarly arranged sequence of values from a different one of the screen cells in the screen cell array. Binary values are generated for each comparison as to whether or not the value of the pixel from the two dimensional array exceeds the screen comparison value of the screen cell array pixel. These binary values are used to control selective exposure of microdots on a printing plate to a laser beam.

The method may be repeated for each of a plurality of primary colors. In accordance with another embodiment of the invention, black content of the image may be processed using a screen cell array having a higher resolution so that the printing plate for the black content can be produced with a higher resolution than the printing plates for the primary colors.

A system of an embodiment of the invention includes the image data storage that contains the two dimensional array of optical density values and a screen data storage that contains the screen cell array. A comparator compares pixels from the two dimensional image array with the screen cell array to generate binary signals. Binary signals are used to control the operation of a laser beam. The screen cell arrays for the primary colors provide enhanced gray level content despite the lower resolution.

Other objects and advantages of the present invention will become apparent during the following description of the presently preferred embodiments of the invention taken in conjunction with the drawings.

BRIEF DESCRIPTION OF THE DRAWINGS

FIG. 2 is a partially completed representation of an example of a 7×7 screen cell.

FIG. 3 is a representation of a microdot pattern obtained for a value 5 with the screen cell of FIG. 2.

FIG. 4 is a partially completed representation of an example of a 14×14 screen cell array made up of four 7×7 screen cells.

FIG. 5 is a partially completed representation of an example of a 14×14 screen cell array for use in an embodiment of the invention.

FIG. 6 is a representation of a microdot pattern obtained for a value 5 with the screen cell array of FIG. 4.

DETAILED DESCRIPTION OF THE PREFERRED EMBODIMENTS

Figure 1:
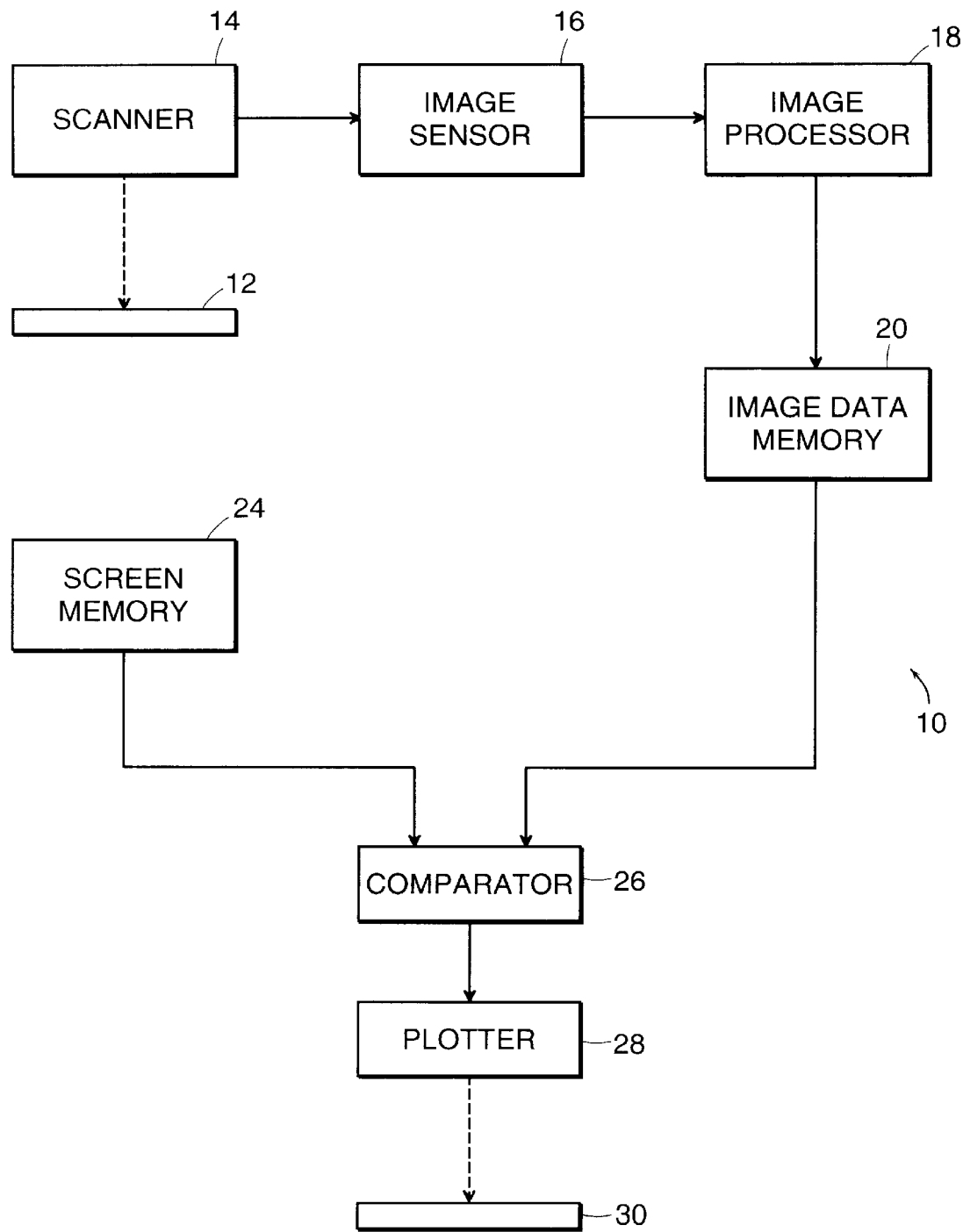
FIG. 1 is a block diagram of a system for use in achieving enhanced gray levels in printing plates in accordance with an embodiment of the invention.

Referring now to FIG. 1, there is shown a system 10 for reproducing an image 12 on a printing plate 30 in accordance with an embodiment of the invention. The system 10 includes a scanner 14 which optically scans an image 12 and generates image signals that are sensed by an image sensor 16. The image signals are processed in a processor 18, conventionally using a page description language interpreter, to produce optical density value arrays at a desired plotting resolution for each of the basic colors. These typically include the primary colors of magenta, cyan and yellow as well as values for black content. The image data thus obtained is made immediately available or stored in image data storage such as a memory 20 or a disk drive. A plotting of the image is performed under the command of a comparator 26. The comparator 26 may be a hardware comparator or may be software for performing a comparison in a processor. Optical density image signals representing variations in optical density of the image 12 taken from the image data storage 20 or directly from the processor 18 and optical density values from a screen memory 24 are compared in the comparator 26. Each comparison results in a binary value typically either a 1 or a 0 depending on whether or not the value of the pixel from the two dimensional image array exceeds the screen comparison value of the screen cell array in the screen memory 24. The output of the comparator controls the laser output of a plotter 28 to reproduce a half-tone image on the plate 30. The plate is typically an aluminum sheet coated with a photo or thermally sensitive emulsion. The plotter contains a laser beam which is switched on or off in response to the binary values obtained from the comparator 26. The lithographic process exposure followed by developing leaves oleophillic and hydrophillic areas on the plate. The process of plotting the plate may be repeated for each printing plate corresponding to each of its basic colors.

In accordance with an embodiment of the invention, the printing plate production process can be made to function more quickly by using lower resolution. For example, plotting at 1000 pixels per inch takes about twice as fast as plotting at 2000 pixels per inch. In order to maintain image quality in the form of providing a sufficient number of gray levels, consider not just a single cell but an array of screen cells as the unit for gray level manipulation. Gray levels are achieved by adding or deleting pixels from a screen cell. If we consider an array of two screen cells (10×10) each having 10 pixels turned on, there are a total of 20 pixels enabled or 10%. If a pixel is added to each cell, there is a total of 22 pixels or 11%. There is an intermediate gray level which can be created by adding a pixel to only one of the screen cells for a total of 21 or 10.5%. By addressing an array of screen cells as the unit for gray level modulation rather than individual screen cells, more gray levels can be achieved in those cases where screen frequency and resolution limit the size of the screen cell.

The selection of the screen cell to which a pixel is added can be done either in a deterministic or random fashion. In either case, it is necessary to add the pixels with a uniform distribution that avoids discernible clustering of pixels so as to avoid the appearance of artifacts. For example, if an intermediate level of gray is desired, a screen array can be said to be made up of a plurality of screen cells. For example, four 7×7 screen cells can be found in a 14×14 screen cell array. If an intermediate level of gray is desired, all the odd screen cells can be given an extra pixel. The next higher level of gray would be achieved by turning on all the even cells. A more refined deterministic method for adding pixels will be described below.

Figures 2, 3, 4:
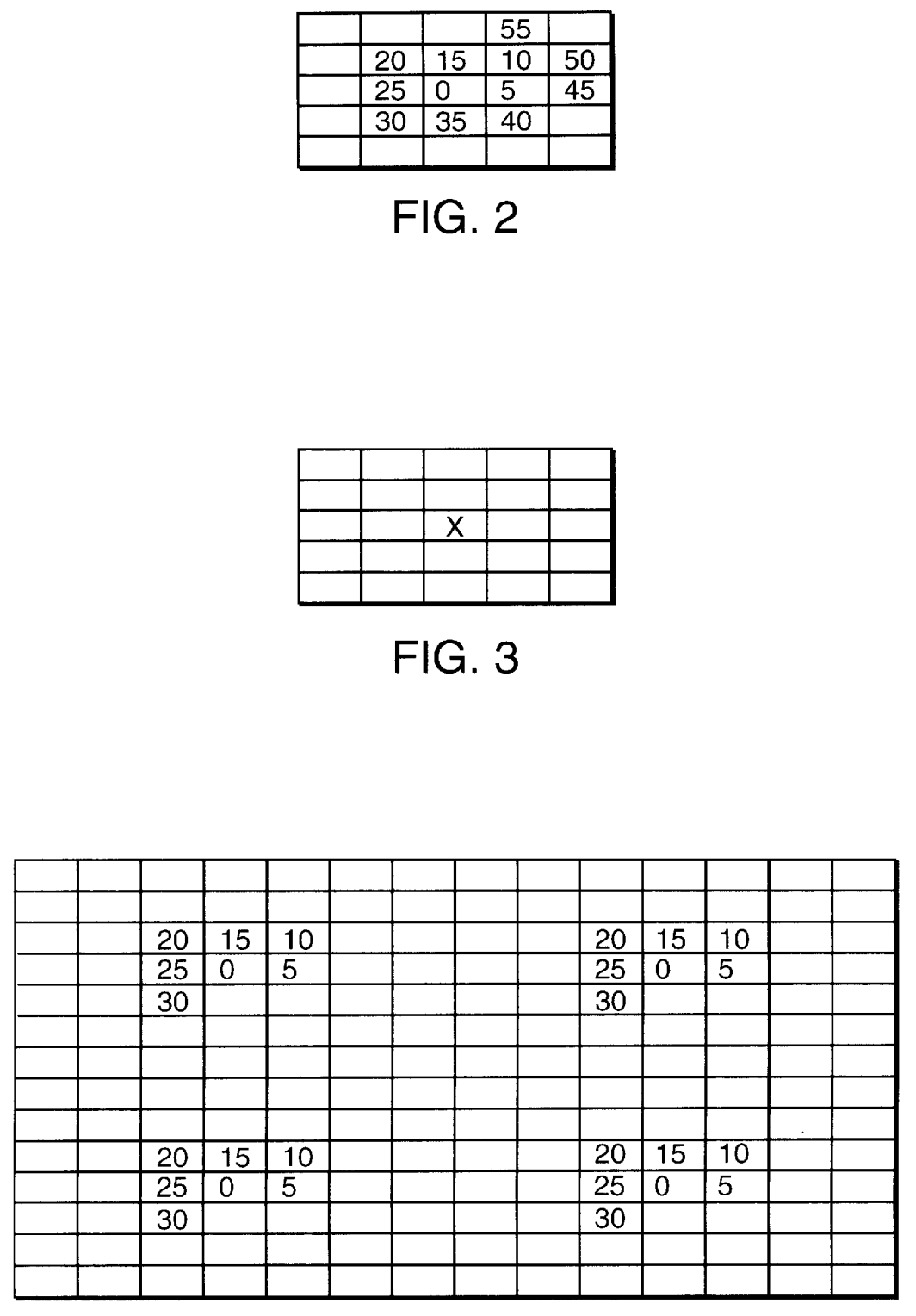

The use of 16×16 or 14×14 screen cells at 1000 pixels per inch may not provide sufficient image quality. By dividing the screen cell array into smaller screen cells, additional dot frequency is achieved. Each screen cell is used to control the growth of a printing dot. In a screen cell, there is a value for each gray level. A spiral printing dot growth pattern may look as shown in FIG. 2. In a smaller screen cell such as the 7×7 cell shown in FIG. 2, the comparison values in the cell need to be spread out so they can represent the whole gray scale range. Instead of the comparison values increasing in increments of 1 from 0–255 as they would in a 16×16 screen cell, the comparison values have larger steps. If the screen cell of FIG. 2 is compared against an optical density value of 5, the result would look as shown in FIG. 3. The use of smaller cells compresses the number of gray levels that can be represented.

A screen cell array is composed of multiple individual screen cells. An array is not limited to any particular number of cells. An embodiment in which there are four screen cells per screen array is analyzed herein as an example. FIG. 4 shows a screen cell array consisting of four 7×7 screen cells. For illustration purposes, a portion of the screen comparison values are shown. Each cell in the screen cell array of FIG. 4 has the same values and each cell will respond in the same fashion. Consequently, the screen cells in the array will have the same gray level response.

Figures 5, 6:
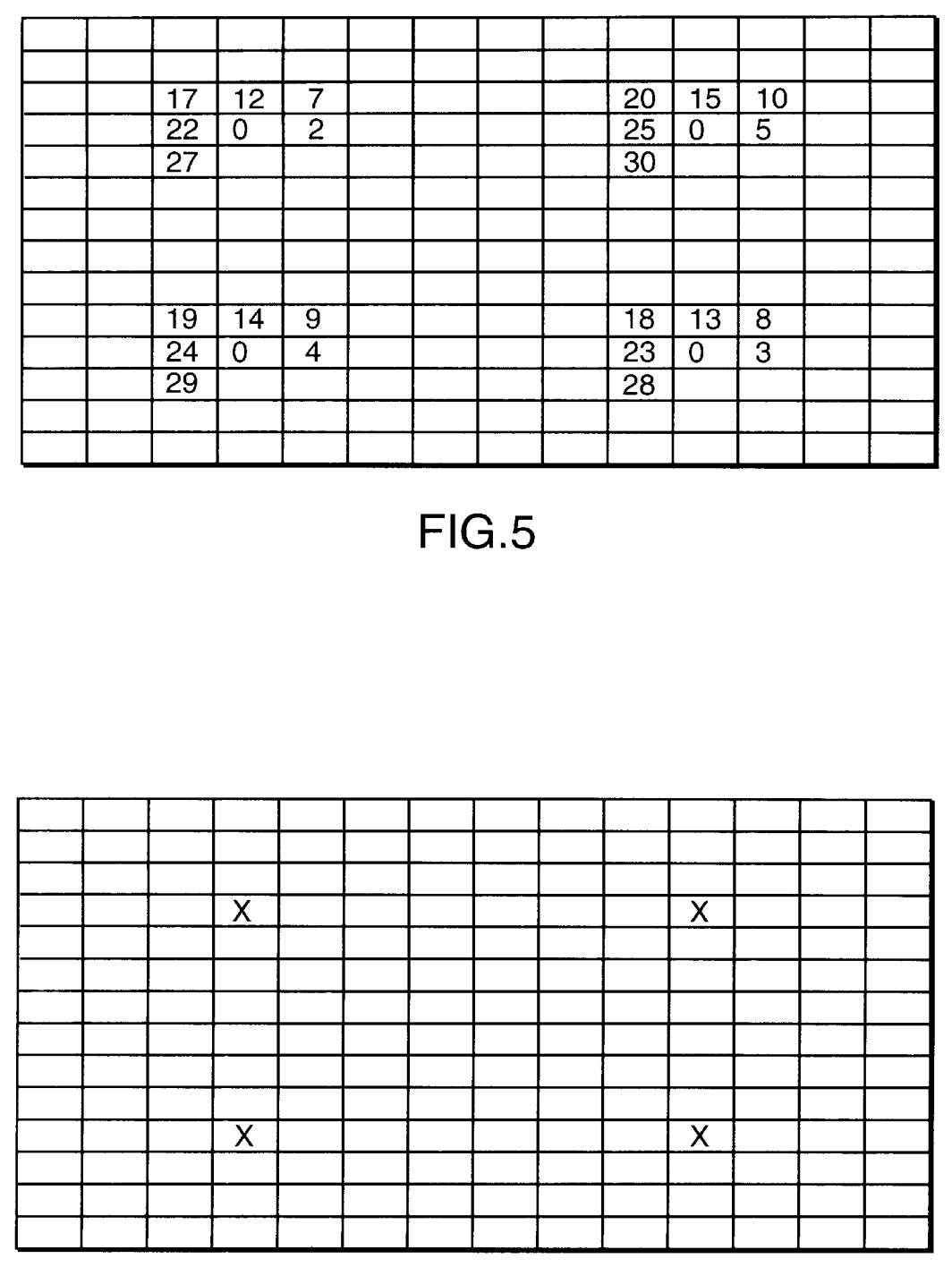

In accordance with an embodiment of the invention, the gray level response in the screen cell array can be enhanced by changing the dot growth patterns of the individual cells. For example, in the screen cell array of FIG. 5, the screen comparison values are arranged in each of the cells to produce different gray level responses in each of the cells. Each of the four screen cells shown in the screen cell array of FIG. 5 produces a dot that increases in size for each screen cell as the value of the optical density compared therewith increases. However, each increases the dot size at different gray levels. It is noted that with the exception of the end point 0, when the screen comparison values of one cell in the array are compared with an increasing sequence of values in a second of the screen cells, the values are interleaved with one another. Thus, comparing the sequence 0, 2, 7, 12, 17, 22, 27 with the sequence 0, 5, 10, 15, 20, 25, 30, it is noted that 5 falls between 2 and 7, that 10 falls between 7 and 12 and that 15 falls between 12 and 17, etc.

Figure 7:
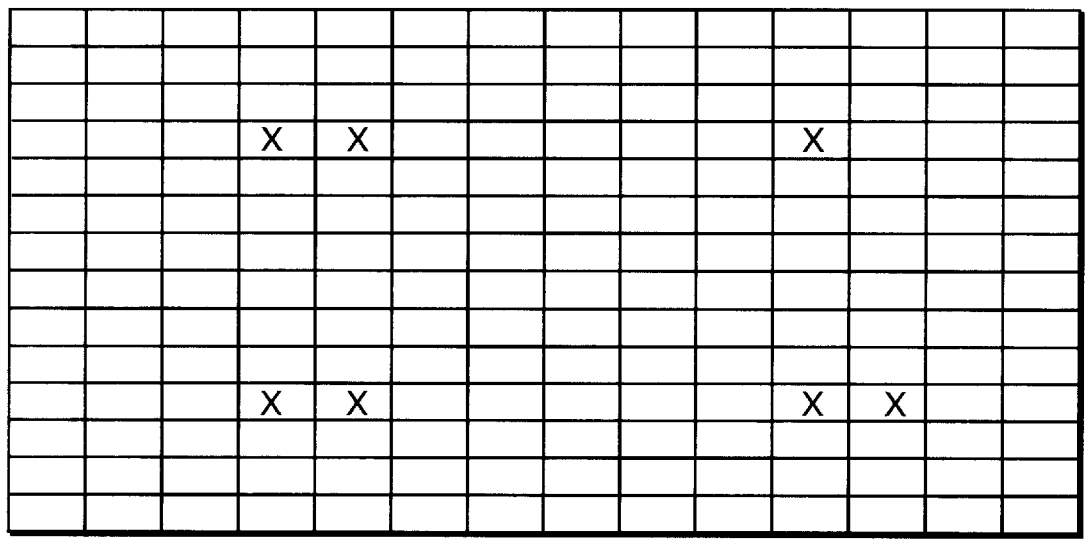
FIG. 7 is a representation of a microdot pattern obtained for a value 5 with the screen cell array of FIG. 5.

Before each pixel from a rasterized page is imaged, its gray value (typically in the range 0–255) is compared with the contents of its corresponding screen cell address. If the gray value of the pixel is greater than the value in the screen cell, a pixel is exposed, otherwise there is no exposure. The screen cell arrays are tiled over the surface of the image since the screen cell array is smaller than the plate array typically. For example, a 40" square plate imaged at 1000 pixels per inch is a 40,000×40,000 array. Whereas a screen cell array may be on the order of 14×14. An index into the screen cell is derived from the plate address by using the remainder of the address divided by the screen cell size. The arrangement of screen cells in the screen cell array may be repeated in all tiles over the image surface. Alternatively, the order and arrangement of the screen cells in a screen cell array can be varied from one array to the next in a random fashion. While possibly altering the location of pixels, the gray level response of each screen cell array remains identical. Assuming an optical density value of 5 is constant over the area encompassed by a screen cell array, then comparing the optical density value of 5 with the screen cell array of FIG. 4 produces the binary value output shown in FIG. 6, whereas a comparison between the optical density value of 5 and the screen cell array of FIG. 5 produces the binary value results shown in FIG. 7. Thus, in using the screen cell array of FIG. 5, enhanced gray levels are achieved despite the use of smaller screen cells. The plotter 28 either exposes or does not expose a pixel on a plate in response to the binary value shown in FIG. 7.

Using the screen cell array for achieving enhanced gray levels as described above, it is possible to attain the desired image quality at lower resolution thereby speeding the printing process for producing the printing plates. High frequency screens can be imaged at low resolutions. In the case of images which contain text, even higher quality may be desired while the printed images are otherwise quite acceptable. In accordance with a further embodiment of the invention, the black printing plate may be generated at a higher resolution than the primary colors (CMY). Using this method, the optical density values for the black plate would be produced by the page description language interpreter at a higher resolution than was used for the colors. For example, the resolution for black may be double the resolution used for the other colors.

Of course, it should be understood that various changes and modifications to the preferred embodiments described above will be apparent to those skilled in the art. For example, the sizes of the screen cell arrays, the number of screen cells each array contains and the screen cell comparison value selected for each screen cell may be altered from those shown in the examples given herein. The principles for selecting such screen cell arrays are set forth so that one of ordinary skill in the art may select screen comparison values suitable for any particular printing application. These and other changes can be made without departing from the spirit and scope of the invention and without diminishing its attendant advantages. It is, therefore, intended that such changes and modifications be covered by the following claims.

We claim:

1. A method of digitally reproducing an image on a printing plate comprising:

providing a digitization of the image;

determining a two dimensional array of optical density values from the digitization of the image;

comparing each pixel of the two dimensional array with a correspondingly located pixel in a screen cell array comprised of a repetitive pattern of a plurality of different screen cells, each screen cell having a two dimensional array of screen comparison values for producing a printed dot which expands in size when compared with increased optical density values, each screen cell including screen comparison values which when arranged in a sequence of increasing values are interleaved with values in a similarly arranged sequence of values from one of the different screen cells in the screen cell array;

generating a binary value for each comparison in response to whether or not the value of the pixel from the two dimensional array exceeds the screen comparison value of the screen cell array pixel; and selectively exposing microdots on the printing plate to a laser beam in accordance with the generated binary values.

2. A method of digitally reproducing a color image including black text on a set of printing plates comprising:

producing a two dimensional array of optical density values for the image at a first resolution for each of three primary colors;

producing a two dimensional array of optical density values at a second resolution, greater than the first resolution, for black content in the image;

comparing each pixel of the two dimensional arrays for the primary colors with a correspondingly located pixel in a screen cell array, said screen cell array comprised of a repetitive pattern of a plurality of different screen cells, each screen cell having a two dimensional array of screen comparison values for producing a printed dot which expands in size when compared with increased optical density values, each screen cell including screen comparison values which when arranged in a sequence of increasing values are interleaved with values in a similarly arranged sequence of values from one of the different screen cells in the screen cell array;

comparing each pixel of the two dimensional array for black with a correspondingly located pixel in a screen cell array;

generating a binary value for each comparison in response to whether or not the value of the pixel from the two dimensional array exceeds the screen comparison value of the screen cell array pixel;

making a printing plate for each primary color at the first resolution by selectively exposing microdots on a plate to a laser beam in accordance with the generated binary values; and making a printing plate for black at the second resolution by selectively exposing microdots on a plate to a laser beam in accordance with the correspondingly generated binary values.

3. A system for digitally reproducing an image on a printing plate comprising;

image data source providing a two dimensional array of optical density values representative of the image;

screen data storage containing a screen cell array comprised of a repetitive pattern of a plurality of different screen cells, each screen cell having a two dimensional array of screen comparison values for producing a printed dot which expands in size when compared with increased optical density values, each screen cell including screen comparison values which when arranged in a sequence of increasing values are interleaved with values in a similarly arranged sequence of values from one of the different screen cells in the screen cell array;

a comparator, coupled to said image data source and to said screen data storage, so that each pixel in the two dimensional array is compared with a correspondingly located pixel in the screen cell array to generate a binary signal for each comparison in response to whether or not the optical density value of the pixel from the two dimensional array exceeds the screen comparison value of the screen cell array pixel; and a laser beam selectively operated in accordance with the generated binary signals so as to expose a printing plate.

* * * * *